(12) United States Patent
Fiatal et al.

(10) Patent No.: US 9,930,478 B2
(45) Date of Patent: *Mar. 27, 2018

(54) LOCATION-BASED OPERATIONS AND MESSAGING

(71) Applicant: Seven Networks, LLC, Marshall, TX (US)

(72) Inventors: Trevor Fiatal, San Carlos, CA (US); Jason Guesman, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/708,253

(22) Filed: May 10, 2015

(65) Prior Publication Data

US 2015/0264522 A1 Sep. 17, 2015

Related U.S. Application Data

(63) Continuation of application No. 12/848,858, filed on Aug. 2, 2010, now Pat. No. 9,055,102, which is a continuation of application No. 11/607,620, filed on Dec. 1, 2006, now Pat. No. 7,769,395.

(60) Provisional application No. 60/805,301, filed on Jun. 20, 2006.

(51) Int. Cl.
| | |
|---|---|
| *H04W 24/00* | (2009.01) |
| *H04W 4/02* | (2018.01) |
| *H04L 29/12* | (2006.01) |
| *H04L 29/08* | (2006.01) |

(52) U.S. Cl.
CPC .......... *H04W 4/02* (2013.01); *H04L 29/12122* (2013.01); *H04L 61/1547* (2013.01); *H04W 4/028* (2013.01); *H04L 67/18* (2013.01); *H04L 67/306* (2013.01)

(58) Field of Classification Search
CPC ............... H04M 3/54; H04M 2242/30; H04M 3/42348; H04M 2242/14; H04M 3/42059; H04M 3/42229; H04M 2203/2072; H04M 3/53308; H04M 15/8033; H04M 15/8044; H04M 15/8055; H04M 2242/04;
(Continued)

(56) References Cited

U.S. PATENT DOCUMENTS

| | | | |
|---|---|---|---|
| 7,519,042 B2 | 4/2009 | Gorday et al. | |
| 2004/0132438 A1* | 7/2004 | White | H04M 1/72563 455/418 |
| 2004/0203855 A1 | 10/2004 | Veerasamy et al. | |

(Continued)

OTHER PUBLICATIONS

Non-Final Office Action dated Nov. 6, 2014 for U.S. Appl. No. 12/848,858.
(Continued)

*Primary Examiner* — Fred Casca
(74) *Attorney, Agent, or Firm* — NK Patent Law, PLLC

(57) ABSTRACT

A system includes a first mobile device configured to provide information concerning a physical location of the first mobile device and a second mobile device configured to receive the information concerning the physical location of the first mobile device. A contacts database is provided for the first mobile device based on input of a user of the first mobile device such that communication is allowed with the second mobile device based on the contacts database.

26 Claims, 3 Drawing Sheets

(58) Field of Classification Search
CPC . H04M 2207/20; H04W 4/021; H04W 4/001;
H04W 4/12; H04W 8/18; H04W 4/06
USPC ............. 370/341, 329, 331, 317; 455/456.1,
455/456.3, 417, 422.1, 414.2, 433, 445
See application file for complete search history.

(56) References Cited

U.S. PATENT DOCUMENTS

| | | |
|---|---|---|
| 2005/0136895 A1 | 6/2005 | Thenthiruperai et al. |
| 2006/0099969 A1 | 5/2006 | Staton et al. |
| 2006/0121916 A1 | 6/2006 | Aborn et al. |
| 2006/0178133 A1* | 8/2006 | Kim ............... H04M 1/274516 455/412.1 |
| 2006/0223518 A1* | 10/2006 | Haney ................ H04W 4/023 455/420 |
| 2006/0285674 A1 | 12/2006 | Le Creff et al. |
| 2006/0293057 A1* | 12/2006 | Mazerski ................ H04M 3/38 455/445 |
| 2007/0060196 A1 | 3/2007 | Sharma |
| 2007/0077949 A1 | 4/2007 | Henderson et al. |
| 2007/0249365 A1 | 10/2007 | Jendbro |
| 2008/0046510 A1* | 2/2008 | Beauchamp ......... G06Q 10/107 709/204 |

OTHER PUBLICATIONS

Final Office Action dated May 21, 2013 for U.S. Appl. No. 12/848,858.
Non-Final Office Action dated Dec. 6, 2012 for U.S. Appl. No. 12/848,858.
Non-Final Office Action dated Aug. 14, 2009 for U.S. Appl. No. 11/607,620.
Final Office Action dated Jan. 7, 2009 for U.S. Appl. No. 11/607,620.
Non-Final Office Action dated Jun. 23, 2008 for U.S. Appl. No. 11/607,620.

* cited by examiner

LOCATION-BASED OPERATIONS AND MESSAGING

CROSS-REFERENCE TO RELATED APPLICATIONS

This application is a continuation of U.S. patent application Ser. No. 12/848,858 filed Aug. 2, 2010 and entitled "Location-based Operations and Messaging," which claims priority as a continuation to U.S. patent application Ser. No. 11/607,620 filed Dec. 1, 2006 and entitled "Location-based Operations and Messaging," which claims the priority benefit of U.S. provisional patent application No. 60/805,301 filed Jun. 20, 2006 and entitled "Communication and Content Sharing Across Social Networks." The present application is related to U.S. patent application Ser. No. 11/363,912 filed Feb. 27, 2006 and entitled "Context Based Action." The disclosures of these commonly owned and assigned applications are incorporated herein by reference.

BACKGROUND OF THE INVENTION

1. Field of the Invention

The present invention relates to location-based operations and messaging. More specifically, the present invention relates to location-based operations and messaging in the context of mobile devices such as cellular telephones, smart phones, personal data assistants (PDAs), wireless electronic mail devices, and the like.

2. Description of Related Art

An individual may receive communication in a variety of ways, including through a telephone call, short message service (SMS) text messaging, instant messaging (IM), and/or electronic mail (e-mail). Further, an individual may have multiple telephone numbers, text messaging services, instant messaging services, and/or e-mail providers. For example, an individual may have separate telephone numbers for home, office, and mobile device(s); separate e-mail addresses for personal and work use; and use separate instant messaging services for different groups of contacts.

The variety of available communication media allows for an individual to receive communications in multiple ways. An advantage of an individual having multiple communication media is that these media provide options and alternatives should one or more of the media fail to provide means to promptly reach the individual. Notwithstanding, these multiple options for communicating with an individual complicate the decision-making process with regard to which communication media to use.

Successfully contacting an individual may, for example, require some foreknowledge regarding his/her availability with respect to each communication medium. Without such knowledge, there is presently no way to determine which communication medium has the best chance of reaching the individual short of testing each communication medium individually. Such trial-and-error may be inefficient, time-consuming, and ultimately fail to reach the individual since the availability of each communication medium and, further, an individual's availability through a particular medium are not static. Availability and likelihood of successful communication through a particular medium constantly change due to, at least in part, the movement of the individual to different physical locations, which may have different restrictions or limitations with respect to communication.

Some mobile devices include location-based utilities, such as accessibility to or interaction with the Global Positioning System (GPS). GPS-equipped mobile devices may be capable of determining location of the device using trilateration. Trilateration uses signals from a plurality of GPS satellites and the time the signals take to reach a GPS-equipped mobile device to determine distances between each of the plurality of GPS satellite and the mobile device. Those distances may be used to determine the physical location of the mobile device.

Further, some presently available mobile devices continually transmit signals through base stations. A base station may include multiple transmitters/receivers (transceivers) for the purpose of connecting mobile devices within a particular geographical region to their network. Each base station may serve regions, also referred to as "cells," ranging in size from a fraction of a mile across to 10 miles or more across. Identifying which cell is servicing the mobile device may serve to determine the general physical location of the mobile device.

Some GPS-equipped telephones may also operate in conjunction with the Assisted Global Positioning System (A-GPS). In conjunction with GPS, A-GPS utilizes information from other sources, such as base stations, to help determine a mobile device's location more quickly and accurately than GPS alone.

There is a need in the art for taking location information, such as that provided by GPS, base stations, and/or A-GPS, into account in intelligently determining a communication medium for efficiently contacting a user of a mobile device.

SUMMARY OF THE INVENTION

Exemplary systems and methods of the present invention determine an optimal medium for communications with a user of a mobile device based on a location of the mobile device. In various embodiments of the present invention, location information can be established by a component such as GPS or A-GPS module at the mobile device. The mobile device provides the location information to an intermediate computing device such as a communications management server. That location information may be accessed and used by other devices to help determine an optimal medium for effective communication with the user of the first mobile device.

Location information may be used to indicate whether the user is accessible through certain communication media. For example, if the user is in transit, he/she would not be immediately accessible at the home and office telephones or certain e-mail addresses. In another example, if the user is in the office, he/she may not be immediately accessible through the home or possibly even mobile telephone Some embodiments of the present invention may include location-based communication systems where a first mobile device may determine its location and provide the location information to an intermediate computing device. In some embodiments of the present invention, location information may be determined by GPS and/or A-GPS component. The location information is accessed and considered by a second mobile device in determining which communication medium is likely to reach the user of the first mobile device in a timely fashion. Some embodiments of the present invention allow for an intermediate device to determine the optimum communication medium and provide information concerning that medium to other devices.

Some embodiments allow for mobile devices to be configured as cellular telephones. In addition to determining an optimal communication medium, various embodiments of the present invention allow for the determination of alternative communication media, also based on the location of the first mobile device.

In some embodiments of the present invention, the first mobile device is further configured to receive location-related content. The location information provided by the first mobile device is used to determine what content to send to the first mobile device. In various embodiments of the present invention, the location-related content is generated by a content generator and transmitted by a content broadcaster. Further, some embodiments of the present invention allow for the first mobile device to receive location-based commands.

Some embodiments of the present invention include the computer programs and instructions for receiving information concerning the user of a mobile device, receiving information concerning the physical location of that mobile device, and determining an optimum medium for communication with the user of the mobile device.

DETAILED DESCRIPTION

The present invention includes system and methods for determining one or more media to use for communications to a user of a mobile device based, at least in part, on the location of the mobile device. By using location information gathered by various means, embodiments of the present invention determine which, out of a plurality of media, may be successfully used to contact the user of the mobile device. Some embodiments further allow for the mobile device to receive location-based content and commands.

Figure 1:
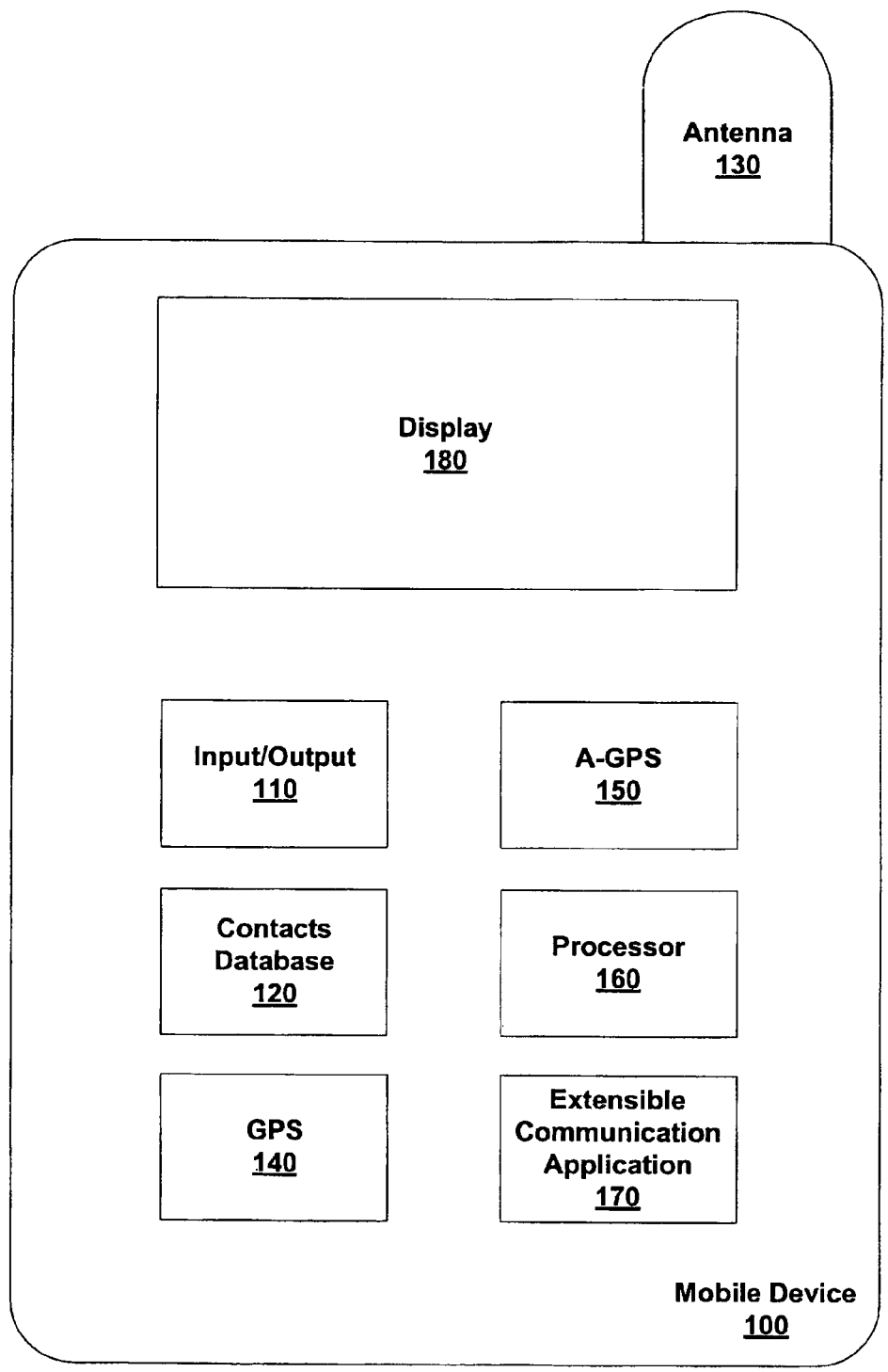
FIG. 1 is an illustration of an exemplary mobile device that may be used in a location-based communication system, according to various embodiments of the present invention.

FIG. 1 is an illustration of an exemplary mobile device 100 that may be used in a location-based communication system, according to various embodiments of the present invention. Embodiments of mobile device 100 may include cellular telephones, smart phones, PDAs, wireless e-mail devices, handheld computers, and the like. Because mobile device 100 is portable, it may be carried by a user at all times. Thus, the location of mobile device 100 may serve as an accurate indication of the location of the user. In some embodiments of the present invention, mobile device 100 may comprise input/output component(s) 110, a contacts database 120, an antenna 130, a GPS component 140, an A-GPS component 150, a processor 160, an extensible communication application 170, and a display 180.

Input/output 110 may be any of a variety of hardware and/or software components configured to allow for communication between the user, other components of mobile device 100, and, in conjunction with antenna 130, other mobile devices. The communications may include audio/visual information, SMS text messages, IM messages, e-mails, and the like. In various embodiments of the present invention, input/output 110 may include a keypad, keyboard, touchpad, touch screen, speech recognition, microphone, speakers, and the like. Some embodiments of the present invention may include one or more input/output 110 components operating individually or in combination with one another.

Contacts database 120 may be configured to store information regarding various contacts. Such contact information may include information concerning various communication media associated with each contact, including addresses, telephone numbers, e-mail addresses, IM addresses, SMS numbers/addresses, and the like. Contacts database 120 may further correlate location information with a particular mode of communication (e.g., if a contact is identified as being at a particular locale via a location determination such as the contact's office or within a particular radius thereof, then contact by office phone as identified in the database 120 may be preferable). Information may be added, deleted, and edited in contacts database 120 using one or more input/output 110 components. For example, a keypad may be used to enter a new telephone number.

Various embodiments of the present invention may allow for personal preferences to be included in contacts database 120 in association with each personal contact entry. For example, a personal contact may have a preference about which e-mail/IM addresses to use. That person may be more likely to check that particular e-mail/IM address more frequently than other communication media and thus receive any messages more quickly than messages sent to another address via another medium. In another example, a personal contact may prefer to use landline telephones versus mobile telephones whenever possible. Therefore, when that person is at home or at work, he/she may turn off or otherwise deactivate the mobile telephone making the landline telephone the best way to reach that person.

Antenna 130 may be configured to receive and transmit various electromagnetic waves, including, for example, radio signals. Various embodiments may include external antennas, internal antennas, GPS antennas, wireless network antennas, and the like. The electromagnetic waves received and transmitted by antenna 130 may convey various kinds of information, including the communication information generated or received by input/output components 110.

For example, an SMS text message keyed into a keypad may be translated into an electromagnetic medium and transmitted by antenna 130 to another device. Using information concerning communication media (e.g., mobile telephone number) belonging to a personal contact from contacts database 120, the electromagnetic waves emitted by antenna 130 may be specifically directed to a particular device belonging to that particular contact person. In some embodiments of the present invention, the transmission and reception of various signals may be performed by various communication apparatus in a communication network.

In various embodiments of the present invention, GPS component 140 may be configured to determine a physical location of mobile device 100 using GPS satellite radio signals. GPS satellites orbit the earth in precise, predetermined intervals, broadcasting signals detectable by mobile device 100. GPS component 140 is configured to process the signals from various GPS satellites, using the time between signal generation and reception to calculate the various distances between GPS component 140 and each GPS satellite. In a process called trilateration, GPS component 140 then uses those distances to pinpoint a location of GPS component 140, which is coupled to or integrated with mobile device 100. Various embodiments may allow for a user of mobile device 100 to use input/output 110 (e.g., keypad) to request that GPS component 140 determine the user's own current location and/or determine directions to another location. That location information derived by GPS component 140 may be further linked to map data or other location information as may be stored in a local or remote memory component accessible by the components of the presently disclosed system and further correlated with the locale of a particular contact and a mode of contacting that contact.

One problem with using GPS component 140 alone to determine a location of mobile device 100 is that it can be slow and/or inaccurate under various circumstances (e.g., time-to-first fix (TTFF)). For example, GPS component 140 may perform slowly and/or produce inaccurate results in areas with uneven terrain, including hills and skyscrapers, where GPS satellite signals may be subjected to physical or electromagnetic interference. Operating in conjunction with GPS component 140, A-GPS component 150 may be any of a variety of software applications configured to (for example) expedite TTFF and make the trilateration process more accurate and otherwise alleviate any variety of GPS interference problems.

A-GPS component 150 may be configured to operate in conjunction with GPS component 140, hardware and software applications on mobile device 100 for interacting with base stations, and a variety of other resources to support GPS component 140 in determining an accurate location of mobile device 100. These other resources may not rely as heavily on line of sight as does GPS satellite signal trilateration and thus, may not be as affected by variations in terrain, urban topography, and the like. In some embodiments of the present invention, A-GPS component 150 may use topographical, city, and/or various other maps to pinpoint a location of mobile device 100 with varying degrees of specificity. For example, a location may be described in terms of coordinates, addresses, map displays, proximity to predetermined locations, or various combinations thereof.

Processor 160 is configured to execute a variety of operations, including taking location information into account in determining an optimum communication medium for reaching an individual. The likelihood of an individual promptly receiving a communication using a given communication medium depends on a variety of factors, including, for example, personal preferences. Even without knowledge concerning the individual's personal preferences, however, processor 160 can use the individual's location to determine the communication medium most likely to be successful at contacting the individual. In some embodiments of the present invention, a GPS component 140, alone or in conjunction with A-GPS component 150, may be used to establish that individual's location. Processor 160 may also use the individual's location in conjunction with various other factors, such as known personal preferences, to determine the most effective medium of communication for reaching the contact.

In one exemplary embodiment, processor 160 may determine an effective medium of communication based on knowledge of the individual's location alone in determining which medium to use. For example, an individual may have only home and mobile telephone numbers as voice communication media. The location of the individual as determined through location analysis allows the processor 160 to assess the likelihood that one of the two telephone numbers should be used to reach the individual in a timely fashion. If the contact is currently away from home, the likelihood of reaching the contact at the home telephone number decreases significantly. On the other hand, if the individual is located at home, he/she may be more likely to answer the home telephone rather than the mobile telephone.

Extensible communication application 170 allows for the use of a single mobile device in efficiently managing multiple communication media. Allowing for integration and cross-platform interoperability, extensible communication application 170 further allows a user of mobile device 100 to check the status of various communications media in a cumulative, integrated setting, so that a user does not have to log repeatedly into each individual service to be able to check for messages. Various embodiments of extensible communication application 170 allow for authentication and secure transmission for each communication medium. In various embodiments of the present invention, extensible communication application 170 further integrates various address books, contact lists such as those in contacts database 120, calendars, and the like.

Extensible communication application 170 may include any of a variety of software applications configured to integrate the variety of protocols and/or applications required to access various communications media via mobile device 100. Extensible software application may be similar to those described in U.S. provisional patent application No. 60/805,301, which has previously been incorporated herein by reference. In some embodiments of the present invention, an extensible communications application 170 or other application offering similar functionality and that may assist in making location-based determinations may reside at a communication management server like that described in FIG. 2. Such protocols may include Internet Message Access Protocol (IMAP), Instant Message and Presence Service (IMPS), Session Initiation Protocol for Instant Messaging and Presence Leveraging Extensions (SIP/SIMPLE), Post Office Protocol 3 (POP3), Simple Mail Transfer Protocol (SMTP), Hypertext Transfer Protocol (HTTP), SMS, Internet Protocol (IP), Session Initiation Protocol (SIP) and the like.

A variety of applications may be accessible and integrated with extensible communication application 170. For example, an individual may have multiple e-mail addresses, such as Yahoo!®, Gmail®, Microsoft® Outlook, and the like. An individual may have multiple IM addresses, such as Yahoo!® IM, American Online® (AOL) IM, Google Talk (GTalk™), ICQ and the like. Further, incorporating an application, such as Jabber°, may enable near-universal interoperability with IM applications such as AOL/AIM, Yahoo!® IM, GTalk™, and various other communications protocols. Extensible communications application 170 may operate in conjunction with input/output component 110 and/or antenna 130.

By operating in conjunction with extensible communication application 170; display 180 may be configured to display a user environment through which various communications applications can be conveniently accessed. In various embodiments of the present invention, display 180 may include indications and/or links to updated information concerning the user's e-mails, instant messages, text messages, voice-mail messages, and the like. Therefore, a user of mobile device 100 can determine the status of all his/her communication media from display 180. For example, the user might see display 180 indicating that he/she has received 1 new voicemail message, 2 new e-mails at a personal e-mail address, 1 new e-mail at a work e-mail address, 2 new SMS text messages, 1 new instant message at Yahoo! IM, and 2 new instant messages at AOL/AIM. Further, the user may be able to access any of those messages from display 180 simply by clicking a link, pressing a button, or other input/output components 110.

In various embodiments of the present invention, display 180 may also operate in conjunction with contacts database 120 to display information for a contact. For example, when a user searches for a contact, the information concerning that contact's various communication media may displayed by display 180. Display 180 may further reflect indications concerning the current presence, availability, and/or log-in status of the contact through each communication medium, as determined and transmitted by the contact's mobile device, according to various embodiments and further described in FIG. 2.

Figure 2:
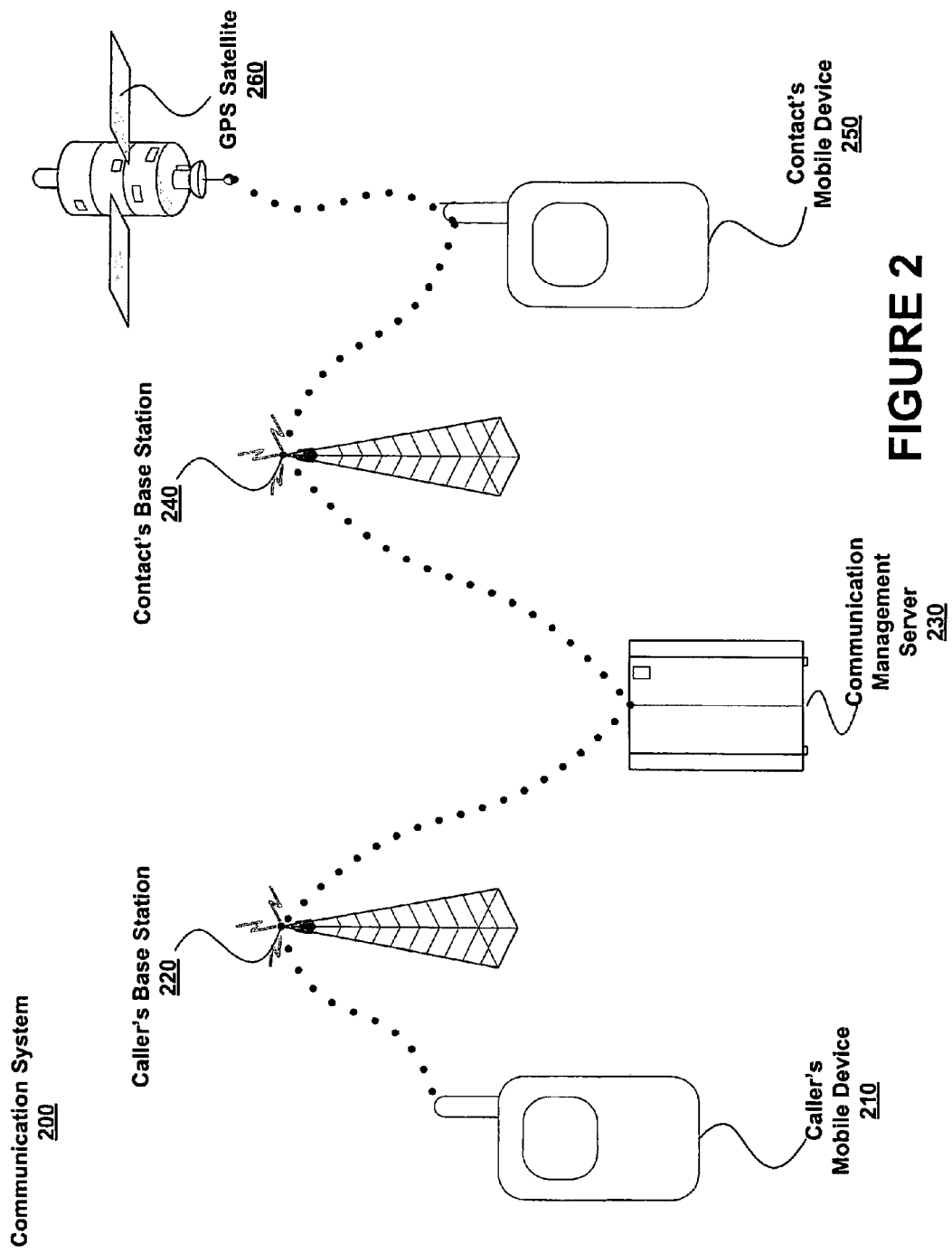
FIG. 2 is an illustration of an exemplary implementation of a location-based communication system, according to various embodiments of the present invention.

FIG. 2 is an illustration of an exemplary implementation of a location-based communication system 200, according to various embodiments of the present invention. The illustrated embodiment of location-based communication system 200 comprises a caller's mobile device 210, a caller's base station 220, a communication management server 230, a contact's base station 240, a contact's mobile device 250, and GPS satellite 260.

As illustrated in FIG. 2, caller's mobile device 210 may initiate communication with a chosen contact's mobile device 250 using various intermediaries, including caller's base station 220, communication management server 230, and contact's base station 240. Various other intermediate communication equipment as known in the art may also be used, such as switching stations. In some embodiments of the present invention, certain communication equipment may be integrated. For example, communication management server 230 may be integrated with network service provider equipment. In some embodiments, the network service provider may "host" the communication management server 230 such that its functionality may be offered to subscribers of its network. In addition, caller's base station 220 and contact's base station 240 may be the same base station when a caller's mobile device 210 and a contact's mobile device 250 are in the same cell. In various embodiments of the present invention, caller's mobile device 210 and contact's mobile device 250 may comprise some or all of the components referenced with respect to mobile device 100, illustrated in FIG. 1.

Caller's base station 220 may be configured to provide communication services to mobile devices within a predefined region or a "cell." The size of the region may vary according to such factors as topography, population, cellular phone traffic, and the like. When an active (e.g., 'turned on') caller's mobile device 210 enters a cell, it connects to the local base station by transmitting radio signals concerning its presence in the cell. Those radio signals are detected by the local base station serving that cell (e.g., caller's base station 220 in FIG. 2).

In some embodiments of the present invention, caller's mobile device 210 may travel through a plurality of cells, and caller's base station 220 may comprise the plurality of base stations serving those cells. When caller's mobile device 210 moves from one cell into another, the caller's mobile device's 210 radio frequency connection is "handed off" from one base station to another. The handoff may be controlled by a switching station (not shown) configured to control various aspects of cellular traffic. Base stations are connected to a switching station, which allows for the switching station to monitor the locations of active mobile devices, arrange handoffs between base stations, monitor communications between mobile devices, and the like. The switching station may also direct calls from the caller's mobile device 210 to a recipient base station (e.g., contact's base station 240) serving the cell where contact's mobile device 250 is located, then to the contact's mobile device 250. Contact's mobile device 250, when active, is connected to its local base station, which is in turn connected to a switching station.

In some embodiments of the present invention, the location of contact's mobile device 250 may be determined by which base station it is connected to (i.e., which cell it is in) and as may be further determined by A-GPS component 150 or the like in conjunction with various software for interacting with base stations. Location determination may also involve the use of contact's mobile device's 250 GPS component 140, which is configured to use signals from GPS satellite 260 to determine the location of contact's mobile device 250. GPS satellite 260 is representative of the plurality of GPS satellites in orbit and those that may be required for trilateration.

Along with various other information, location information may be relayed back to communication management server 230 which is, in turn, communicatively coupled to caller's mobile device 210 in communication system 200. Communication management server 230 may be like that communication management server described in U.S. patent application Ser. No. 11/363,912, which has previously been incorporated herein by reference. In various embodiments of the present invention, caller's mobile device 210 then determines the best medium to reach the contact person, which may or may not include actually calling contact's mobile device 250 based, in part, on information provided by contact mobile device 250 to communication management server 230. Some embodiments of the present invention may allow for communication management server 230 to determine the best communication medium based, in part, on location information provided by contact's mobile device 250 to communication management server 230. Communication management server 230 may provide information concerning that medium to a caller's mobile device 210.

In some embodiments of the present invention, location information (e.g., GPS, A-GPS, cell/base station) for contact's mobile device 250 may be updated automatically at communication management server 230 at various intervals (e.g., through regularly scheduled polling). In other embodiments, caller's mobile device 210 may request location information about contact's mobile device 250 in order to enter into communication with the user. In such an embodiment, the user of caller's mobile device 210 may designate a user to be contacted from contacts database 120. Caller's mobile device 210 may (via communication system 200) contact communication management server 230 which may request location information about the designated contact's mobile device 250 if that information is not readily or currently available. For example, location information may be out of date and new location information may be required in order to best elect a communication medium for contacting a particular user. "Fresh" location information may be obtained through polling by the communication management server 230 or a specific location information request which may be initiated through, for example, an SMS or an IP trigger. A user of contact's mobile device 250 may also set their device to regularly push location information to communication management server 230.

In some embodiments of the present invention, contact's mobile device 250 may be configured to receive location-based content when the location of contact's mobile device 250 is determined and relayed to communication management server 230. For example, contact's mobile device 250 may receive information concerning a local movie theater near the location of contact's mobile device 250, as indicated by the updated location information maintained on and/or received by communication management server 230. Some embodiments allow for the user of the mobile device to request location-based information, subscribe to a service that sends location-based information, or the like. In the above example, the user of contact's mobile device 250 may have subscribed to a various services providing film and entertainment-related media.

Further, contact's mobile device 250 may receive entertainment-related news, polls, and various items of interest, based at least in part on the location of contact's mobile device 250. Some embodiments of the present invention may include a content generator (e.g., an application and/or related hardware to generate content in a variety of formats) (not shown) and/or content broadcaster (e.g., a particular server or computing device configured to distribute, for example, content generated by the content generator) (not shown), which respectively generate and transmit location-related content to mobile devices at a particular location based on location information provided by communication management server 230.

In some embodiments of the present invention, a location may be determined with varying degrees of specificity, including, for example, a street address, a block, a neighborhood; and/or a city. In some embodiments of the present invention, location may be described even more specifically, such as, for example, a floor of a building, a section of the floor, and/or a room in the building. Location-based messaging and/or other operations may then take place based on this location information.

Further, contact's mobile device 250 may also receive location based commands. For example, if contact's mobile device 250 is located in a movie theater, contact's mobile device 250 may be configured to receive commands concerning turning off the ringer, switching to silent/vibrate mode, or the like. These commands are processed by the relevant hardware and/or software at the mobile device as if the user were manually imputing such commands at the mobile device. Some embodiments may allow for the command to subsequently be reversed. In the aforementioned example, the ringer of contact's mobile device 250 may be turned back on, silent/vibrate mode disabled, or the like, once contact's mobile device 250 leaves the vicinity of the movie theater. Various applications may be implemented at communication management server 230 concerning commands as they pertain to particular locales (e.g., deactivating a mobile device in a hospital or church).

Figure 3:
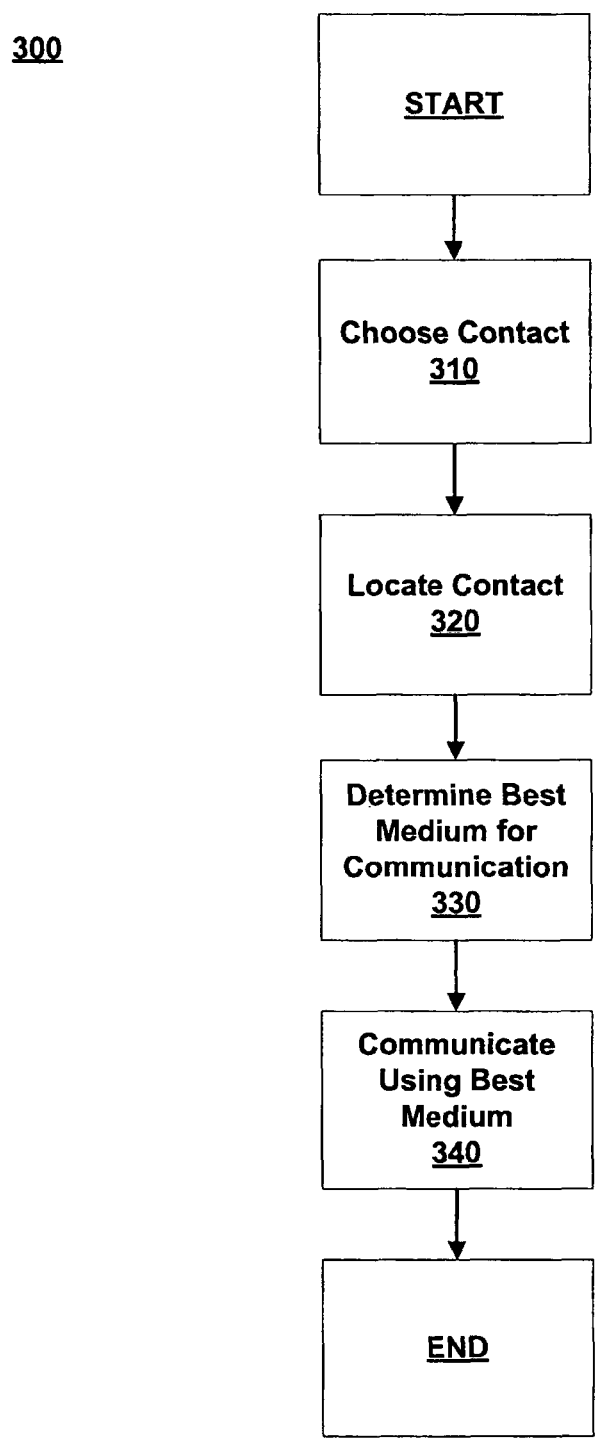
FIG. 3 is a flowchart depicting an exemplary location-based communication method, according to various embodiments of the present invention.

FIG. 3 is a flowchart depicting an exemplary location-based communication method 300, according to various embodiments of the present invention. In this exemplary method 300, a contact person is chosen, located, and then contacted using the medium of communication determined to be the most effective based on at least the location of contact's mobile device 250.

In Step 310, a caller chooses a contact person from a contacts database 120 on caller's mobile device 210. Choosing a contact person may comprise searching a list for the contact person's name, speaking the contact person's name into a speech recognition component, using preset speed-dial buttons, selecting the contact person from a list, and the like. Various embodiments of the present invention may allow for a caller to choose more than one contact person, including, for example, preset groups'.

In Step 320, the location of the contact's mobile device 250 is determined. Caller's mobile device 210 sends communication management server 230 a request for information, which may include location information, concerning the contact's mobile device 250. Contact's mobile device 250 uses GPS information from GPS satellites 260, A-GPS 140 applications, and/or base stations to determine a location, which is transmitted to and maintained on communication management server 230, which provides the information to caller's mobile device 210. In some embodiments, the information may be transmitted directly to a requesting mobile device (e.g., caller mobile device 210).

In Step 330, the information obtained from communication management server 230 is then used by caller's mobile device 210 to determine the best way to communicate with the contact. Factors that may be considered in determining an effective communication medium include predefined addresses associated with certain communication media, proximity to predefined locations and/or addresses, predefined preferences, log-in and/or availability status on various applications, log-in status on various devices, and the like. Various embodiments of the present invention use at least one location-based factor to determine an optimum communication medium.

Some embodiments may further consider a combination of factors, in addition to the at least one location-based factor. In some embodiments of the present invention, Step 330 includes utilizing various processes to weigh the various factors and determine which of the various communication media would be most effective at reaching the contact person. In some embodiments of the present invention, Step 330 further includes determining alternative communication media, based on various factors, including location. For example, e-mailing may be determined to be the best way to communicate with contact, then in descending order, instant messaging, text messaging, and home telephone. Therefore, a caller has the option of attempting multiple communication media in order beginning with the medium determined to be most effective. In some embodiments of the present invention, an alternative communication medium may be suggested automatically, or the caller may request an alternative communication medium. The aforementioned determinations may be the result of a software application stored in memory and/or in conjunction with extensible communication application 170. Such determinations may also be made by similar applications residing at the communication management server 230.

In Step 340, the caller's mobile device 340 communicates with the contact person, i.e., the user of contact's mobile device, using the communication medium determined in the previous step. Communication in Step 340 may comprise calling the contact using the number of the contact's mobile device, calling the contact at home, calling the contact at work, e-mailing at a certain address, instant messaging using a certain service, text messaging, and the like. Step 340 may automatically be executed by extensible communication application 170 following a determination of an optimal communication media by the caller's mobile device 210.

While the present invention has been described in the context of a series of exemplary embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

The invention claimed is:

1. A mobile device comprising:
a radio;
a memory; and a processor configured to receive information concerning a physical location of another mobile device and automatically provide a user of the mobile device a prioritized plurality of communication medium options for communication with a user of the another mobile device based on the physical location of the another mobile device, wherein:
a contacts database is provided for the mobile device such that the prioritized plurality of communication medium options are determined with the user of the another mobile device based on the contacts database and the physical location of the another mobile device;

wherein a communication medium determines a type of message to use for communication to the user of the another mobile device based on the physical location of the another mobile device indicated by the received information identifying the physical location and an association between the communication medium and the physical location, wherein the association is stored at the mobile device;

the mobile device is configured to receive an indication of availability of the user of the another mobile device; and wherein the prioritized plurality of communication medium options are determined from a selection of at least two of a home telephone medium, a mobile telephone medium, an audio/visual medium, a short messaging service (SMS) medium, an instant messaging (IM) medium, and an electronic mail (e-mail) medium.

2. The mobile device of claim 1, wherein the contacts database includes at least one preference associated with each contact within the contacts database.

3. The mobile device of claim 1, wherein the physical location of the another mobile device is updated automatically on the mobile device.

4. The mobile device of claim 1, wherein the mobile device is configured to request the physical location of the another mobile device before entering into a communication with the another mobile device.

5. The mobile device of claim 1, wherein the mobile device is configured to receive location-based content when the physical location of the another mobile device is received.

6. The mobile device of claim 5, wherein the location-based content is provided in response to a subscription from the mobile device.

7. The mobile device of claim 1, wherein the mobile device is configured to receive location-based commands based on the physical location of the another mobile device.

8. The mobile device of claim 1, wherein the mobile device is configured for instant messaging with the another mobile device.

9. The mobile device of claim 1, wherein the processor is further configured to provide the information concerning the physical location of the another mobile device in response to a selection by a user of the mobile device.

10. The mobile device of claim 1, wherein the processor is further configured to receive location-based content.

11. The mobile device of claim 1, wherein the processor is further configured to receive information about a status of the user of the another mobile device.

12. The mobile device of claim 1, wherein the processor is further configured to receive location information related to the another mobile device.

13. The mobile device of claim 1, wherein the prioritized plurality of communication medium options are determined from a selection of at least three of a mobile telephone medium, an audio/visual medium, a short messaging service (SMS) medium, an instant messaging (IM) medium, and an electronic mail (e-mail) medium.

14. A method comprising:
at a mobile device, receiving information concerning a physical location of another mobile device and automatically providing a user of the mobile device a prioritized plurality of communication medium options for communication with a user of the another mobile device based on the physical location of the another mobile device, wherein a contacts database is provided for the mobile device such that the prioritized plurality of communication medium options are determined with the user of the another mobile device based on the contacts database and the physical location of the another mobile device;

wherein a communication medium determines a type of message to use for communication to the user of the another mobile device based on the physical location of the another mobile device indicated by the received information identifying the physical location and an association between the communication medium and the physical location, wherein the association is stored at the mobile device;

receiving an indication of availability of the user of the another mobile device;

wherein the prioritized plurality of communication medium options are determined from a selection of at least two of a home telephone medium, a mobile telephone medium, an audio/visual medium, a short messaging service (SMS) medium, an instant messaging (IM) medium, and an electronic mail (e-mail) medium.

15. The method of claim 14, wherein the contacts database includes at least one preference associated with each contact within the contacts database.

16. The method of claim 14, wherein the physical location of the another mobile device is updated automatically on the mobile device.

17. The method of claim 14, wherein the mobile device requests the physical location of the another mobile device before entering into a communication with the another mobile device.

18. The method of claim 14, further including receiving location-based content when the physical location of the another mobile device is received.

19. The method of claim 18, wherein the location-based content is provided in response to a subscription from the mobile device.

20. The method of claim 14, further including receiving location-based commands based on the physical location of the another mobile device.

21. The method of claim 14, further including transmitting instant messages to the another mobile device.

22. The method of claim 14, further including providing the information concerning the physical location of the another mobile device in response to a selection by a user of the mobile device.

23. The method of claim 14, further including receiving location-based content.

24. The method of claim 14, further including receiving information about a status of the user of the another mobile device.

25. The method of claim 14, further including receiving location information related to the another mobile device.

26. The method of claim 14, wherein the prioritized plurality of communication medium options are determined from a selection of at least three of a mobile telephone medium, an audio/visual medium, a short messaging service (SMS) medium, an instant messaging (IM) medium, and an electronic mail (e-mail) medium.

* * * * *